US012620854B2

(12) United States Patent
Moasher

(10) Patent No.:  US 12,620,854 B2
(45) Date of Patent:  May 5, 2026

(54) COMBINED SPRING AND RETAINING RING

(71) Applicant: Schaeffler Technologies AG & Co. KG, Herzogenaurach (DE)

(72) Inventor: Mohammad Moasher, Fairlawn, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 243 days.

(21) Appl. No.: 18/386,438

(22) Filed: Nov. 2, 2023

(65) Prior Publication Data

US 2025/0149941 A1     May 8, 2025

(51) Int. Cl.
| | |
|---|---|
| *H02K 1/28* | (2006.01) |
| *H02K 7/10* | (2006.01) |
| *F16H 41/00* | (2006.01) |

(52) U.S. Cl.
CPC ................ *H02K 1/28* (2013.01); *H02K 7/10* (2013.01); *F16H 41/00* (2013.01)

(58) Field of Classification Search
CPC . H02K 1/28; H02K 7/10; H02K 7/006; F16H 41/00
See application file for complete search history.

(56) References Cited

U.S. PATENT DOCUMENTS

| | | | |
|---|---|---|---|
| 5,059,844 A | * 10/1991 | Anstine | F16C 35/067 |
| | | | 310/90 |
| 10,352,422 B2 | 7/2019 | Satyaseelan et al. | |
| 2014/0029887 A1 | 1/2014 | Aust | |
| 2018/0062469 A1 | * 3/2018 | Satyaseelan | H02K 1/278 |
| 2018/0112718 A1 | * 4/2018 | Yang | B60K 17/02 |

FOREIGN PATENT DOCUMENTS

| | | |
|---|---|---|
| CN | 201656600 U | 11/2010 |
| JP | H11215750 A | 8/1999 |
| JP | 2003259577 A | 9/2003 |

* cited by examiner

*Primary Examiner* — Thomas Truong

(57) ABSTRACT

A rotor assembly includes a rotor for an electric motor, a rotor carrier non-rotatably connected to the rotor, a rotor carrier flange, and a split spring. The rotor carrier includes a groove and a castellated portion and the split spring is disposed in the groove and arranged to clamp the rotor carrier flange against the castellated portion. The split spring may include an annular portion disposed in the groove and a tapered portion extending radially inwards from the annular portion. The split spring may also include a cut portion separating opposite circumferential ends of the annular portion.

9 Claims, 2 Drawing Sheets

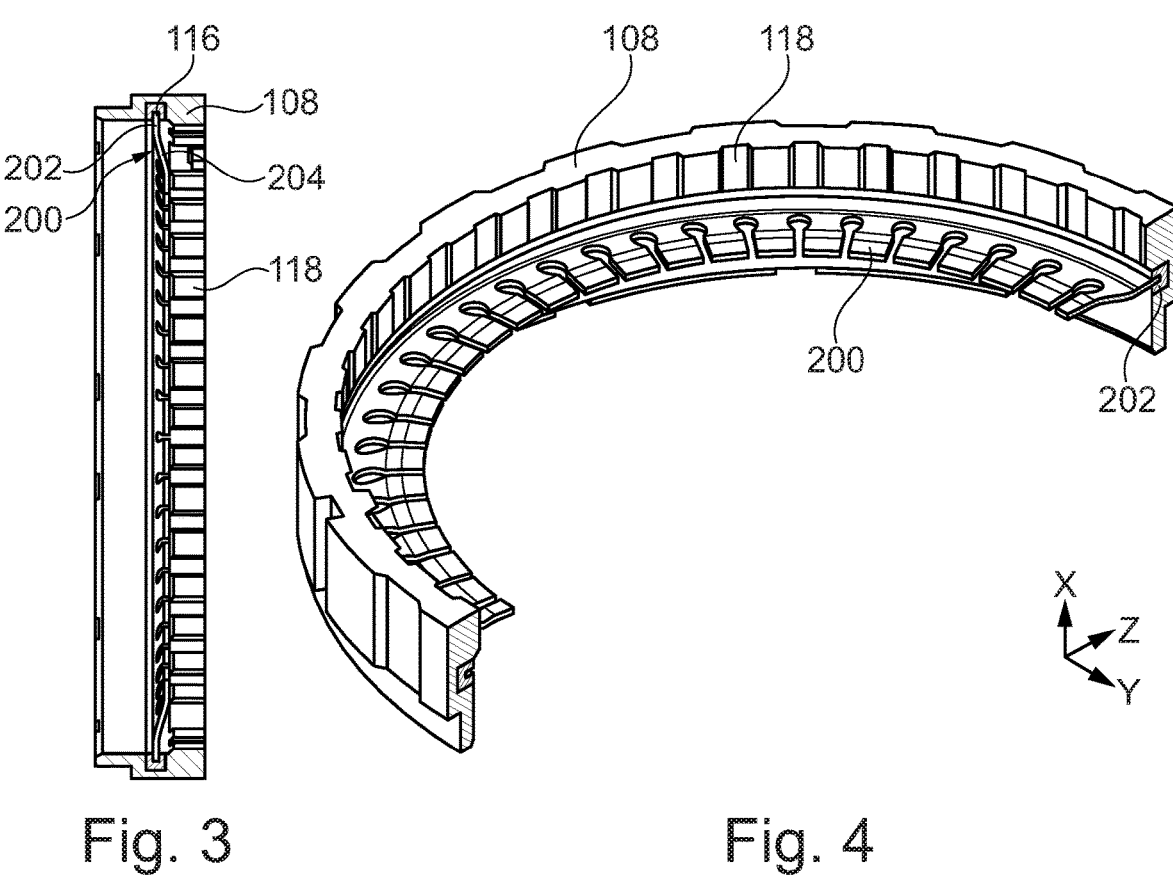
Fig. 3
Fig. 4
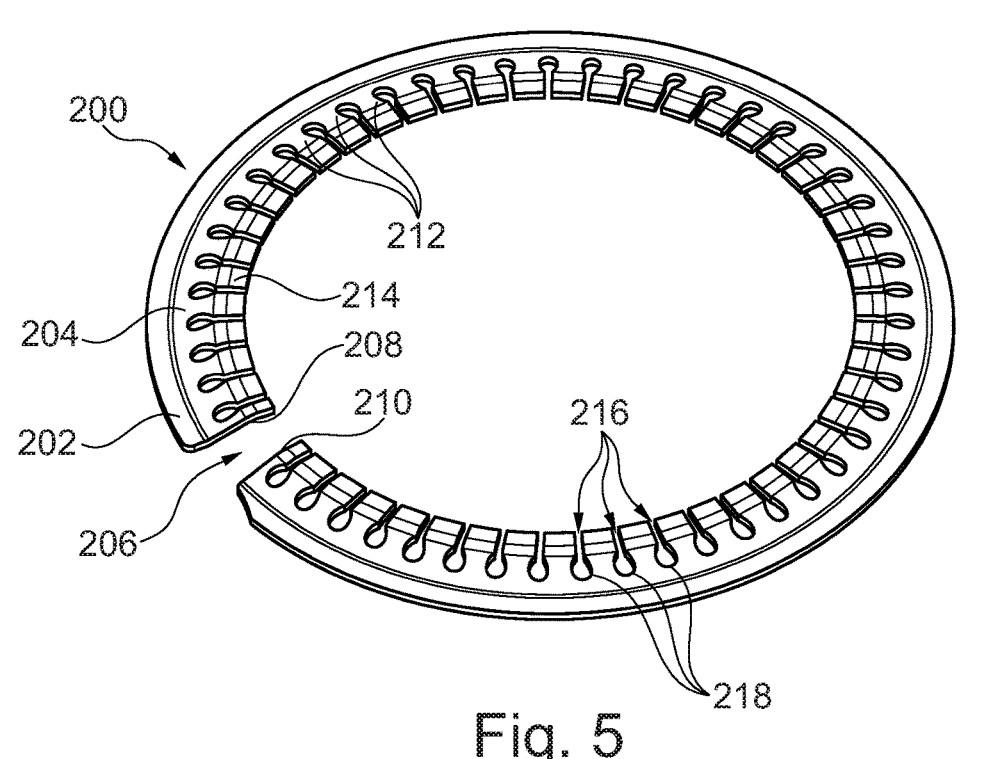
Fig. 5

COMBINED SPRING AND RETAINING RING

TECHNICAL FIELD

The present disclosure relates generally to a retaining ring, and more specifically to a combined spring and retaining ring.

BACKGROUND

A rotor assembly including a spring clamping a rotor carrier flange is known from commonly-assigned U.S. Pat. No. 10,352,422 titled ROTOR CARRIER AND FLANGE ASSEMBLY to Satyaseelan et al., hereby incorporated by reference as if set forth fully herein.

SUMMARY

Example embodiments broadly comprise a rotor assembly including a rotor for an electric motor, a rotor carrier non-rotatably connected to the rotor, a rotor carrier flange, and a split spring. The rotor carrier includes a groove and a castellated portion and the split spring is disposed in the groove and arranged to clamp the rotor carrier flange against the castellated portion. In some example embodiments, the split spring includes an annular portion disposed in the groove and a tapered portion extending radially inwards from the annular portion. In an example embodiment, the split spring also includes a cut portion separating opposite circumferential ends of the annular portion.

In some example embodiments, the tapered portion includes a plurality of radially inwardly extending tabs. In an example embodiment, a quantity of the plurality of radially inwardly extending tabs is at least 35. In an example embodiment, a quantity of the plurality of radially inwardly extending tabs is at least 50. In some example embodiments, each of the plurality of radially inwardly extending tabs comprises a planar portion disposed parallel to the annular portion. In an example embodiment, the planar portions contact the rotor carrier flange. In some example embodiments, the tapered portion includes radial slots disposed between respective pairs of the plurality of radially inwardly extending tabs. In an example embodiment, the tapered portion includes teardrop cutouts on a radial outside of the radial slots. In an example embodiment, the rotor assembly includes a torque converter with a housing forming a hydraulic chamber, and the housing is fixed to the rotor carrier.

BRIEF DESCRIPTION OF THE DRAWINGS

FIG. 3 illustrates a cross-sectional view of a portion of a rotor carrier with a split spring disposed in a groove.

FIG. 4 shows a perspective section view of the rotor carrier and split spring of FIG. 3.

FIG. 5 shows a perspective view of the split spring of FIG. 3.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
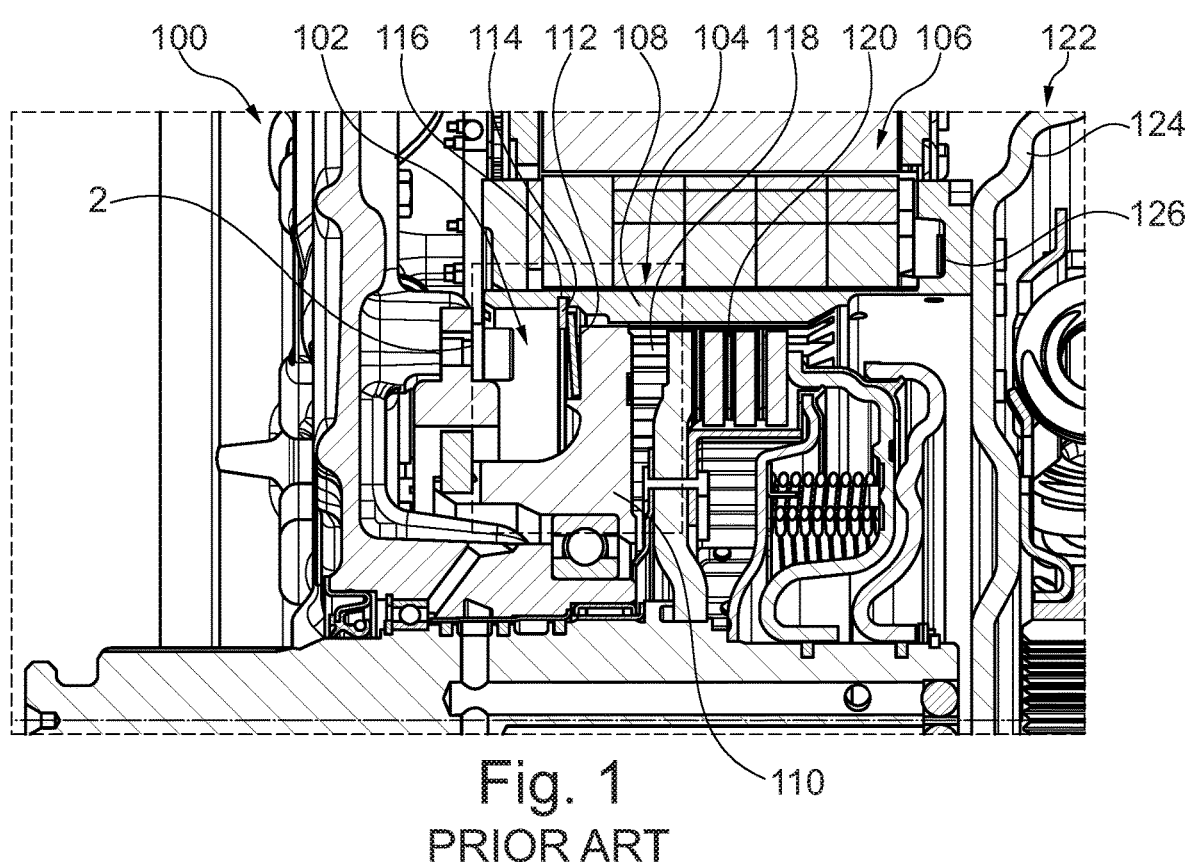
FIG. 1 illustrates a cross-sectional view of a prior art hybrid module assembly.
Figure 2:
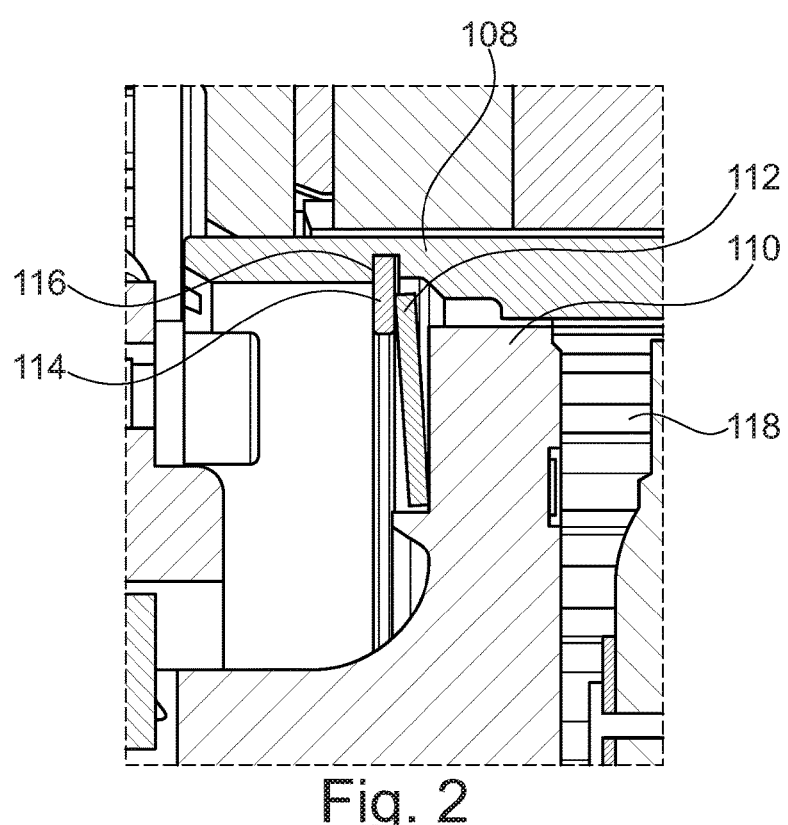
FIG. 2 illustrates a detail view of boxed region 2 in FIG. 1.

The following description is made with reference to FIGS. 1-2. FIG. 1 illustrates a cross-sectional view of prior art hybrid module assembly 100. FIG. 2 illustrates a detail view of boxed region 2 in FIG. 1. Hybrid module assembly 100 includes rotor assembly 102. Rotor assembly 102 includes rotor 104 for electric motor 106, rotor carrier 108 non-rotatably connected to the rotor for cojoint rotation, rotor carrier flange 110, disc spring 112 and snap ring 114. The rotor carrier includes groove 116 and castellated portion 118. Castellated portion 118 includes axial slots arranged to receive clutch plates 120, for example. The snap spring is disposed in the groove and the disc spring is arranged to clamp the rotor carrier flange against the castellated portion.

The following description is made with reference to FIGS. 1-5. FIG. 3 illustrates a cross-sectional view of a portion of rotor carrier 108 with split spring 200 disposed in groove 116. FIG. 4 shows a perspective section view of the rotor carrier and split spring of FIG. 3. FIG. 5 shows a perspective view of the split spring of FIG. 3. Split spring 200 is disposed in groove 116 and, similar to disc spring 112 in FIG. 1, arranged to clamp rotor carrier flange 110 against castellated portion 118.

Split spring 200 includes annular portion 202, disposed in groove 116, and tapered portion 204 extending radially inwards from the annular portion. The split spring includes cut portion 206 separating opposite circumferential ends 208, 210 of the annular portion. In other words, the split spring has a gap in the circumferential direction to provide radial flexibility of the split spring, allowing it to be inserted into the groove. Tapered portion 204 includes radially inwardly extending tabs 212. In the embodiment shown, there are 51 tabs, although other embodiments may include a different number of tabs. For example, other embodiments of the split spring may include at least 35 tabs, or at least 50 tabs.

Each tab 212 includes planar portion 214 disposed parallel to the annular portion. That is, the annular portion and the planar portions are arranged parallel to one another.

When installed in a rotor assembly, the planar portions contact the rotor carrier flange. Tapered portion 204 includes radial slots 216, disposed between respective pairs of the radially inwardly extending tabs, and teardrop cutouts 218 on a radial outside of the radial slots.

Returning to FIG. 1, rotor assembly 102 also includes torque converter 122 (shown partially) with housing 124 (shown partially) forming a hydraulic chamber. Housing 124 is fixed to rotor carrier 108 at rivets 126, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module assembly
102 Rotor assembly
104 Rotor
106 Electric motor
108 Rotor carrier
110 Rotor carrier flange
112 Disc spring
114 Snap ring
116 Groove (rotor carrier)
118 Castellated portion (rotor carrier)
120 Clutch plates
122 Torque converter 124 Housing (torque converter)
126 Rivets
200 Split spring
202 Annular portion
204 Tapered portion
206 Cut portion
208 Circumferential end
210 Circumferential end
212 Radially inwardly extending tabs
214 Planar portion
216 Radial slots
218 Teardrop cutouts

What is claimed is:

1. A rotor assembly, comprising:
a rotor for an electric motor;
a rotor carrier non-rotatably connected to the rotor, the rotor carrier comprising a groove and a castellated portion;
a rotor carrier flange; and
a split spring arranged to clamp the rotor carrier flange against the castellated portion, the split spring comprising:
an annular portion disposed in the groove; and
a tapered portion extending radially inwards from the annular portion, the tapered portion comprising a plurality of radially inwardly extending tabs.

2. The rotor assembly of claim 1 wherein the split spring further comprises a cut portion separating opposite circumferential ends of the annular portion.

3. The rotor assembly of claim 1 wherein a quantity of the plurality of radially inwardly extending tabs is at least 35.

4. The rotor assembly of claim 1 wherein a quantity of the plurality of radially inwardly extending tabs is at least 50.

5. The rotor assembly of claim 1 wherein each of the plurality of radially inwardly extending tabs comprises a planar portion disposed parallel to the annular portion.

6. The rotor assembly of claim 5 wherein the planar portions contact the rotor carrier flange.

7. The rotor assembly of claim 1 wherein the tapered portion comprises radial slots disposed between respective pairs of the plurality of radially inwardly extending tabs.

8. The rotor assembly of claim 7 wherein the tapered portion comprises teardrop cutouts on a radial outside of the radial slots.

9. The rotor assembly of claim 1, further comprising a torque converter comprising a housing forming a hydraulic chamber, wherein the housing is fixed to the rotor carrier.

* * * * *